Figure 5:
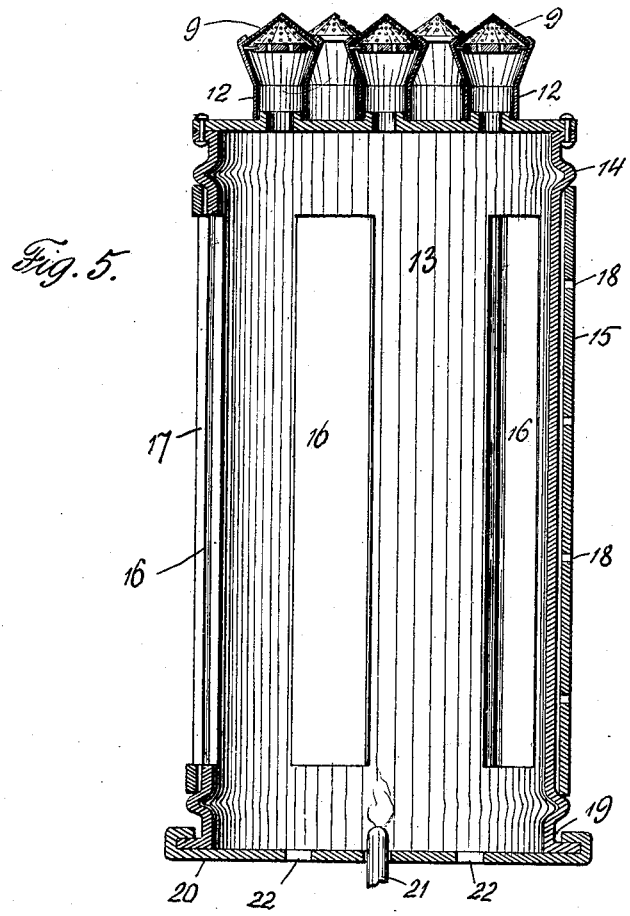

No. 897,207. PATENTED AUG. 25, 1908.
C. H. HENZEL.
AIR MIXER FOR GAS BURNERS.
APPLICATION FILED DEC. 26, 1907.
2 SHEETS—SHEET 1.
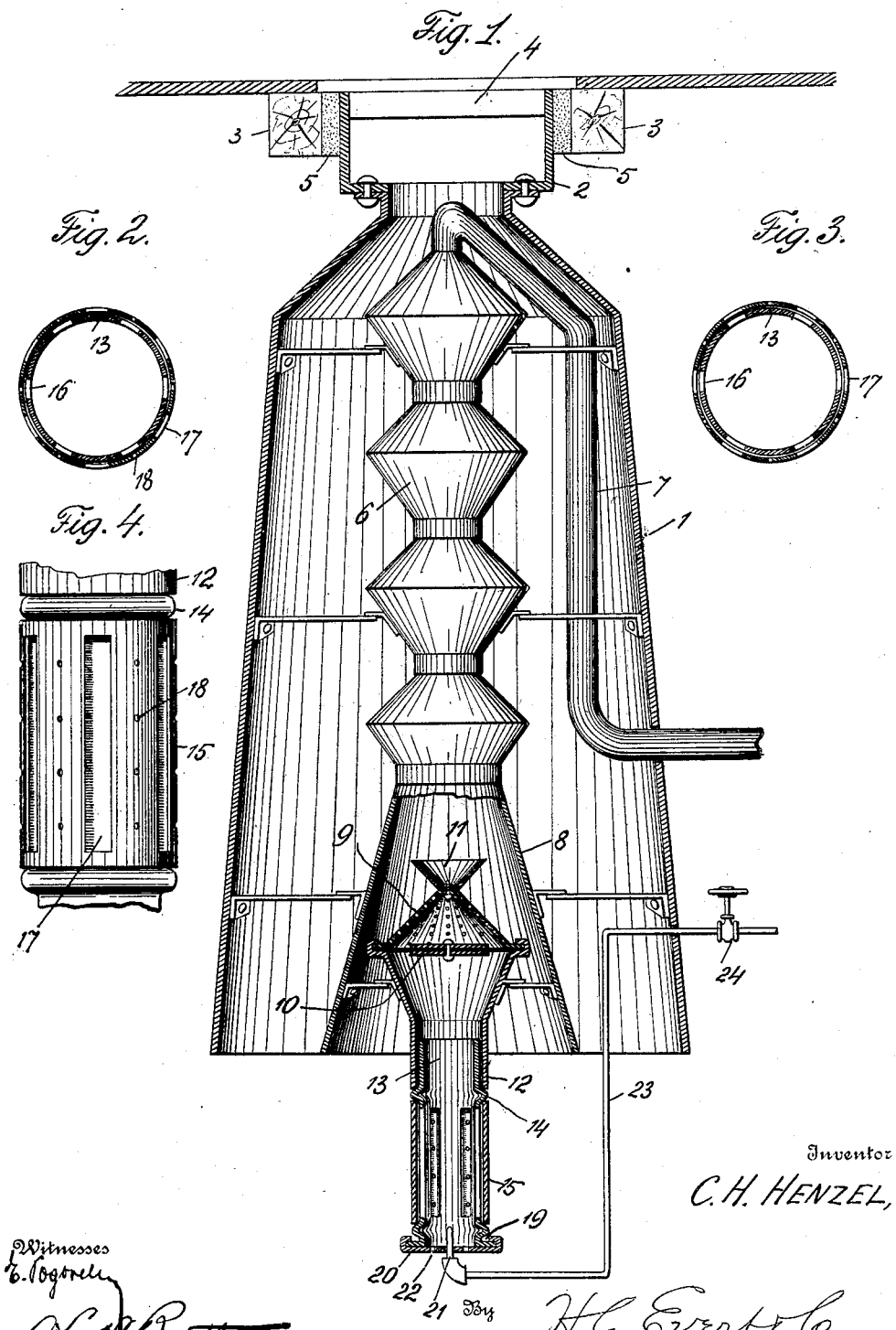
Inventor
C. H. HENZEL,
Witnesses
By
Attorneys No. 897,207. PATENTED AUG. 25, 1908.
C. H. HENZEL.
AIR MIXER FOR GAS BURNERS.
APPLICATION FILED DEC. 26, 1907.

2 SHEETS—SHEET 2.

Witnesses

Inventor
C. H. HENZEL,
By
Attorneys

UNITED STATES PATENT OFFICE.

CASPER H. HENZEL, OF ALLEGHENY, PENNSYLVANIA.

AIR-MIXER FOR GAS-BURNERS.

No. 897,207.  Specification of Letters Patent.  Patented Aug. 25, 1908.

Application filed December 26, 1907. Serial No. 408,077.

*To all whom it may concern:*

Be it known that I, CASPER H. HENZEL, a citizen of the United States of America, residing at Allegheny, in the county of Allegheny and State of Pennsylvania, have invented certain new and useful Improvements in Air-Mixers for Gas-Burners, of which the following is a specification, reference being had therein to the accompanying drawing.

This invention relates to air mixers for gas burners, and has for its object to provide novel and effective means for regulating and controlling the admission of air to a gas burner to effect perfect combustion and derive a maximum amount of heat from a minimum expenditure of fuel.

The present invention is an improvement upon my Patent No. 854,497, granted to me May 21st, 1907, the present improvement residing in a novel air mixer by which the efficiency of the heater is increased. The heater disclosed in the above mentioned patent is particularly designed as a hall heater, wherein gas is used as a heating medium. In this invention I employ a similar structure, and provide the burner thereof with a depending air mixer that can be easily and quickly adjusted. This mixer is adjusted according to the temperature of the compartment in which the heater is located, and in this manner I prevent the formation of carbon in the heater and obtain a greater number of heat units than could be obtained with any other type of mixer.

The invention will be presently described in detail and then specifically pointed out in the claims.

Figure 6:
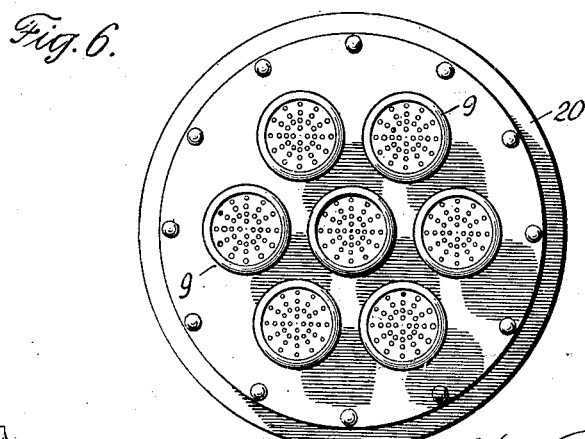

Reference will now be had to the drawing forming a part of this specification, wherein:

Figure 1 is a vertical sectional view of a heater constructed in accordance with my invention, Fig. 2 is an enlarged cross sectional view of the air mixer illustrating the same in a closed position, Fig. 3 is a similar view illustrating the air mixer in an open position, Fig. 4 is an elevation of the air mixer, Fig. 5 is a vertical sectional view of a large air mixer having a plurality of burners, and Fig. 6 is a plan of the same.

In the accompanying drawings, 1 designates a frusto-cone-shaped casing suspended from a box-like structure 2, suitably secured between the joists 3 of the floor. The box-like structure carries a conventional form of register 4 and to protect the wood work surrounding the box-like structure 2 and the register 4, I use asbestos 5 or a similar material.

In the casing 1 is suitably supported a plurality of communicating double frusto cone-shaped casings 6, the uppermost casing being provided with a depending exhaust pipe 7, while the lowermost casing is supported upon a cone-shaped dome 8. In the dome 8 is mounted a perforated burner 9 having a central baffle plate 10 and a deflector 11.

The burner 9 is provided with a depending extension or casing 12 and mounted in said extension or casing is a pipe 13 constituting part of the air mixer. The sleeve 13 is reamed to produce circular ribs 14 one near each end of the sleeve, and revolubly mounted upon the said sleeve 13 between said ribs is a sleeve 15 constituting a shutter. The sleeve 13 is provided with a plurality of equally spaced vertically disposed slots 16. The shutter 15 surrounding the said sleeve 13 is provided with a plurality of slots 17 corresponding in size to the slots 16 of the sleeve 13 and adapted to register with said slots. Between the slots 17 of the shutter 15 are formed a plurality of openings 18, these openings allowing sufficient air to enter the burner to maintain combustion when the shutter is closed.

The bottom of the sleeve 13 is flanged as at 19 and closed by a plate 20, this plate having a central opening for a gas jet 21 and also having a plurality of openings 22 serving functionally the same purpose as the openings 18. The gas jet 21 is connected by a pipe 23 to a suitable supply of gas controlled by a valve 24.

In Figs. 5 and 6 of the drawings, I have illustrated a large mixer as provided with a group of burners 9, these burners and mixer being arranged and designed for large furnaces.

In operation, the air passes into the mixer, and commingling with the gas, passes upwardly to the burner where it is ignited. The products of combustion as they pass from the burner strike the inclined walls of the dome 8 and enter the lowermost casing 6 and from thence pass on to each succeeding casing 6 until they are finally discharged through the exhaust pipe 7. The free flow of the products of combustion is interrupted or retarded by the superposed relation of these casings 6, and the construction as fully shown and described in my prior patent heretofore referred to, tending to cause the casing 6 to become heated and thereby give off sufficient heat to cause the cold air entering the casing 1 to be heated prior to its being discharged through the register 4.

The revoluble shutter 15 can be easily and quickly moved to obtain a proper degree of combustion within the burner 9, the position of the shutter depending upon the temperature of the air in the cellar or compartment in which the heater is used.

Having now described my invention what I claim as new, is:—

An air mixer for gas burners, comprising in combination with a burner having a depending extension, a stationary depending sleeve carried by the burner extension and provided with a plurality of spaced vertical slots, ribs on the exterior of said sleeve adjacent each end thereof, a perforated plate secured to the lower end of said sleeve, and a shutter provided with slots corresponding to the slots in the sleeve and having a plurality of air inlet openings between the slots, said shutter mounted for rotation on the exterior of said sleeve between the ribs on the latter whereby the slots of the shutter may be moved into and out of registry with the slots in the sleeve.

In testimony whereof I affix my signature in the presence of two witnesses.

CASPER H. HENZEL.

Witnesses:
 MAX H. SROLOVITZ,
 C. V. BROOKS.